United States Patent
Suga

(10) Patent No.: US 8,525,691 B2
(45) Date of Patent: Sep. 3, 2013

(54) ELECTRIC EQUIPMENT WITH DIGITAL INTERFACE AND METHOD FOR CONTROLLING THE SAME

(75) Inventor: Kazumi Suga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 535 days.

(21) Appl. No.: 12/574,613

(22) Filed: Oct. 6, 2009

(65) Prior Publication Data

US 2010/0090849 A1  Apr. 15, 2010

(30) Foreign Application Priority Data

Oct. 14, 2008 (JP) ................................ 2008-265714

(51) Int. Cl.
*G01V 3/00* (2006.01)
*H04J 1/16* (2006.01)
*G06F 13/38* (2006.01)

(52) U.S. Cl.
USPC ..................... 340/855.4; 340/855.5; 340/635; 370/242; 710/72

(58) Field of Classification Search
USPC ........ 340/855.1, 855.3, 855.4, 855.5, 870.16, 340/531, 538.15, 653, 538.1; 713/168; 714/821; 375/231, 232, 341, 213; 710/72; 370/242, 248
See application file for complete search history.

(56) References Cited

U.S. PATENT DOCUMENTS

| | | | |
|---|---|---|---|
| 7,269,673 B2 * | 9/2007 | Kim et al. | 710/72 |
| 7,500,032 B2 * | 3/2009 | Kim et al. | 710/72 |
| 7,646,806 B2 * | 1/2010 | Cohen | 375/231 |
| 7,761,709 B2 * | 7/2010 | Choi | 713/168 |
| 8,059,550 B2 * | 11/2011 | Saito et al. | 370/242 |
| 2008/0008165 A1 * | 1/2008 | Ikeda et al. | 370/360 |
| 2008/0025707 A1 | 1/2008 | Sawada et al. | |
| 2008/0195923 A1 * | 8/2008 | Masumori | 714/821 |
| 2009/0157885 A1 | 6/2009 | Takatsuji et al. | |
| 2011/0072298 A1 * | 3/2011 | Kuroda | 714/2 |

FOREIGN PATENT DOCUMENTS

| | | |
|---|---|---|
| JP | 2007-202115 | 8/2007 |
| JP | 2008-052887 | 3/2008 |
| JP | 2008-067284 | 3/2008 |

OTHER PUBLICATIONS

HDMI Licensing LLC. High-Definition Multimedia Interface Specification Version 1.3a, Hitachi, Ltd., et al. (Cited in the Specification [0004] Nov. 10, 2006).

* cited by examiner

*Primary Examiner* — Van T. Trieu

(74) *Attorney, Agent, or Firm* — Cowan, Liebowitz & Latman, P.C.

(57) ABSTRACT

In electric equipment that has a digital interface, an operation that is normally performed by an output terminal during authentication processing is executed on equipment connected to an input terminal of the digital interface by the input terminal as an erroneous connection detection operation. When there is a proper response from the equipment connected to the input terminal of the digital interface in response to the erroneous connection detection operation, the electric equipment detects that the connected equipment has been erroneously connected. When an erroneous connection is detected, the electric equipment gives notice of the detection of the erroneous connection.

23 Claims, 13 Drawing Sheets

F I G. 2

| LOGICAL ADDRESS | DEVICE TYPE |
|---|---|
| 0 | TV Reciver |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

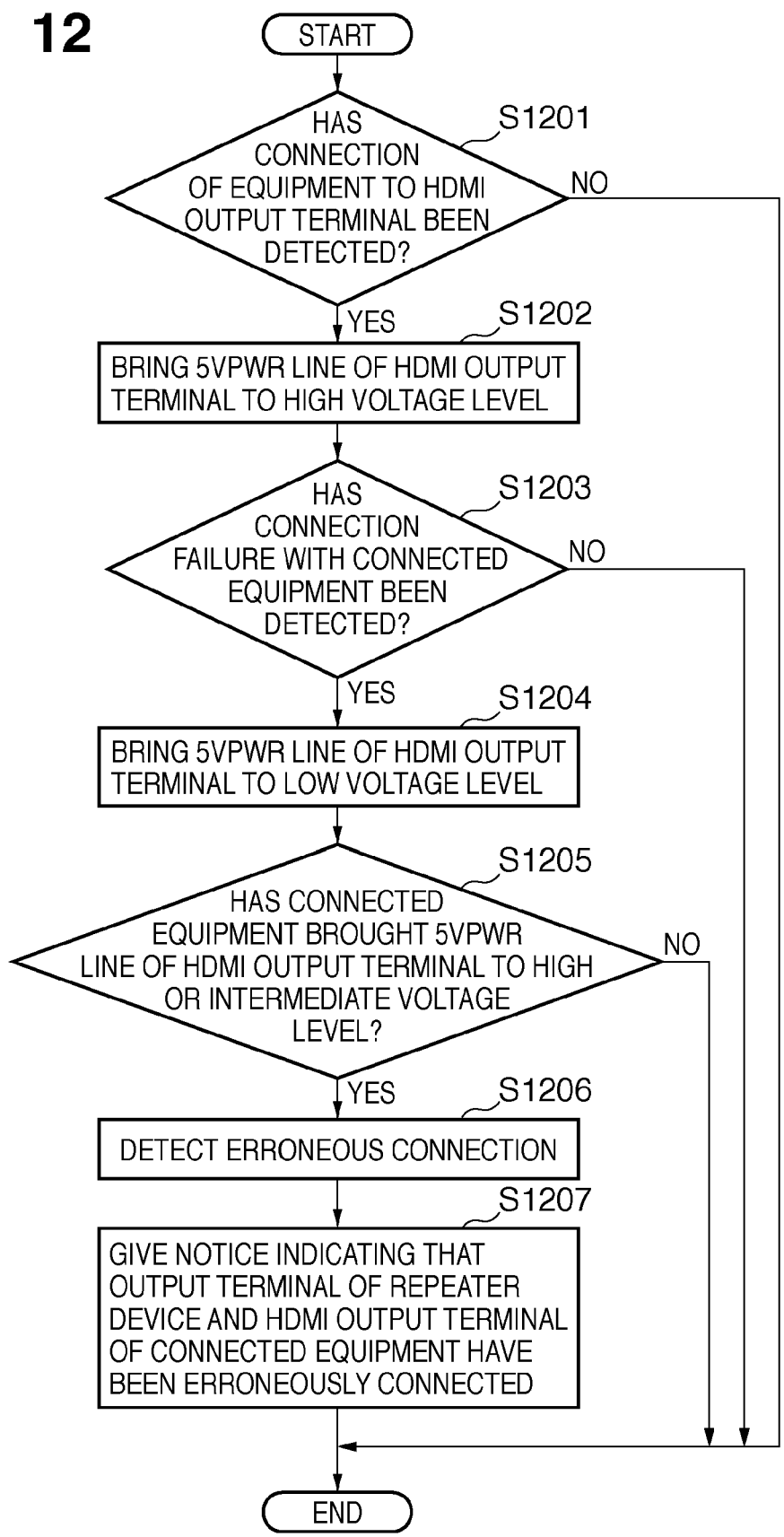

FIG. 13A

| Header / Data Block | | | | | | | | | |
|---|---|---|---|---|---|---|---|---|---|
| 7 | 6 | 5 | 4 | 3 | 2 | 1 | 0 | — | — |
| Information bits | | | | | | | | EOM | ACK |

FIG. 13B

| Header Block | | | | | | | | | |
|---|---|---|---|---|---|---|---|---|---|
| 3 | 2 | 1 | 0 | 3 | 2 | 1 | 0 | — | — |
| Initiator | | | | Destination | | | | EOM | ACK |

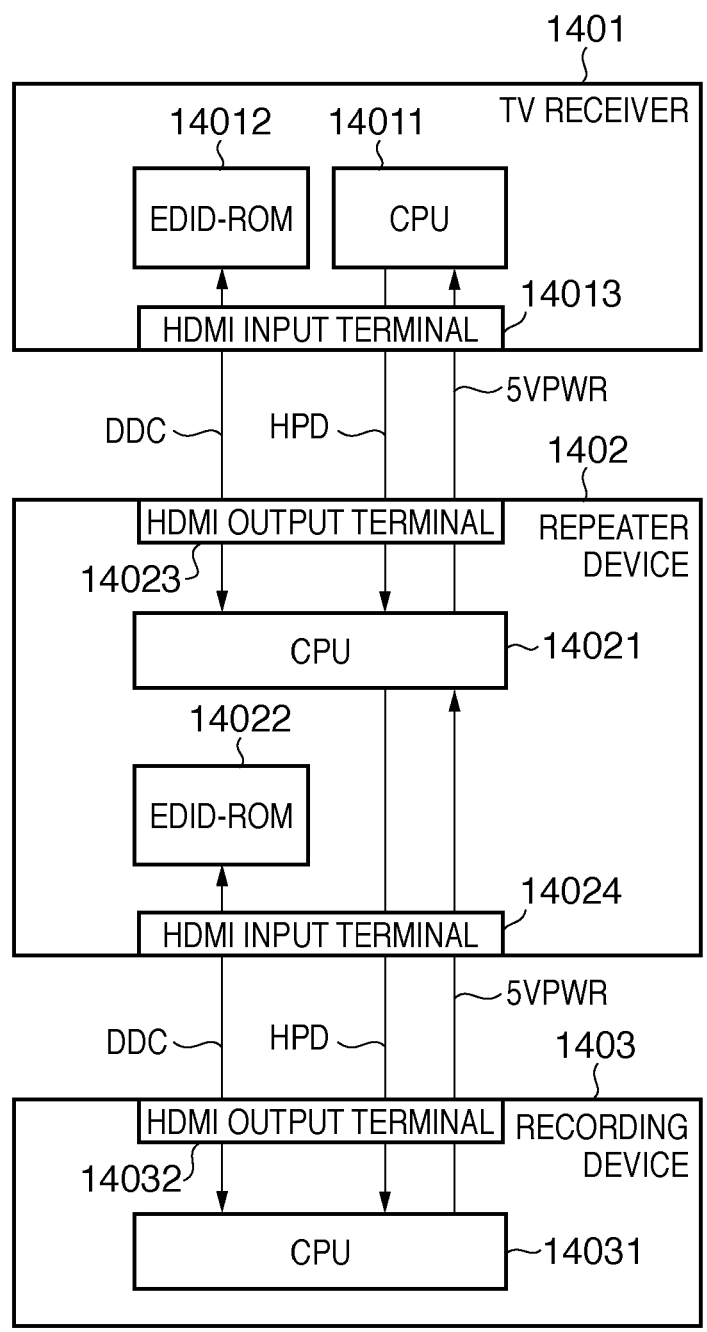

ELECTRIC EQUIPMENT WITH DIGITAL INTERFACE AND METHOD FOR CONTROLLING THE SAME

BACKGROUND OF THE INVENTION

1. Field of the Invention

The present invention relates to electric equipment and a method for controlling the same, and more particularly, to electric equipment that has a digital interface and a method for controlling the same.

2. Description of the Related Art

In recent years, HDMI (High-Definition Multimedia Interface) has been used as a digital interface for equipment that handles high definition video, multi-channel audio and so on. The devices connected with an HDMI can recognize the type or the like of the other device and, therefore, they can not only transfer video and audio signals via a connection cable, but can also control the other device and operate in conjunction with the other device.

FIG. 14 is a diagram showing a communication configuration of a system in which a TV receiver, a repeater device such as an AV (Audio Visual) amplifier, and a recording device such as a hard disk recorder are connected with an HDMI.

The details of the communication between pieces of equipment that are connected with an HDMI can be found in HDMI Licensing, LLC, "High-Definition Multimedia Interface Specification Version 1.3a", Nov. 10, 2006.

A procedure for acquiring a physical address of a repeater device 1402 will be described first. When the repeater device 1402 brings a 5VPWR (+5V power) line of an HDMI output terminal 14023 to a high voltage level, a TV receiver 1401 brings an HPD (Hot-Plug Detect) line of an HDMI input terminal 14013 to a high voltage level. By doing so, the repeater device 1402 recognizes that it is capable of DDC (Display Data Channel) communication with the TV receiver 1401. Subsequently, the repeater device 1402 acquires a physical address from an EDID (Extended Display Information Data)-ROM 14012 of the TV receiver 1401 through DDC communication.

A DDC is a standard defined by the VESA (Video Electronics Standards Association). A DDC is a channel for providing information regarding a display stored in the EDID-ROM on the display side to equipment that transmits display data to the display. The physical address of the TV receiver 1401 is a fixed physical address of 0.0.0.0. The physical address of the repeater device 1402 is specified in the EDID-ROM 14012 provided for each HDMI input terminal of the TV receiver 1401, and can be, for example, 1.0.0.0.

Similarly, a physical address of a recording device 1403 is also acquired from an EDID-ROM 14022 of the repeater device 1402 through DDC communication. The physical address of the recording device 1403 is specified in the EDID-ROM 14022 provided for each HDMI input terminal of the repeater device 1402, and can be, for example, 1.1.0.0.

Next, a method for acquiring a logical address will be described. As shown in FIG. 2, a logical address that can be acquired is preset for each device type.

For example, a recording device can acquire one of "1", "2" and "9", and an audio system (the repeater device 1402 in FIG. 14) can acquire "5". In this manner, the upper limit for the number of logical addresses that can be assigned is set for each device type.

The recording device 1403 broadcasts a Polling message to a logical address (e.g., "1") that the recording device 1403 wants to acquire. If there is no response to the Polling message from any other device (if a message with ACK bit=1 is returned), the recording device 1403 can recognize that the logical address is unoccupied, so it acquires the logical address. If, on the other hand, there is a response from another device (if a message with ACK bit=0 is returned), it means that the logical address has already been acquired by another recording device. In such a case, the recording device 1403 repeats the same process for other available logical addresses (e.g., "2" and "9") to acquire a logical address (see, for example, Japanese Patent Laid-Open No. 2007-202115 and the above-mentioned "High-Definition Multimedia Interface Specification Version 1.3a").

Usually, when connecting two devices via a repeater device, as shown in FIG. 14, the HDMI input terminal of a first device (TV receiver 1401) is connected to the HDMI output terminal of the repeater device 1402, and the HDMI output terminal of a second device (recording device 1403) is connected to the HDMI input terminal of the repeater device.

However, as the HDMI input terminal and the HDMI output terminal of the repeater device appear the same, a situation can occur in which the user erroneously connects input terminals or output terminals.

FIG. 1 is a diagram showing a state in which the input terminals, as well as the output terminals, are erroneously connected when connecting devices as in FIG. 14.

Specifically, in FIG. 1, an HDMI input terminal 1024 of a repeater device 102 and an HDMI input terminal 1013 of a TV receiver 101 are erroneously connected, and an HDMI output terminal 1023 of the repeater device 102 and an HDMI output terminal 1032 of a recording device 103 are erroneously connected.

When erroneously connected as just described, the repeater device 102 and the recording device 103 cannot acquire a physical address and a logical address, remaining in a state in which CEC (Consumer Electronics Control) communication is not possible. Specifically, even when the repeater device 102 brings the 5VPWR line of the HDMI output terminal 1023 to a high voltage level, the repeater device 102 cannot acquire a physical address from an EDID-ROM 1012 of the TV receiver 101. This is because the HDMI output terminal 1023 of the repeater device 102 is not connected to the HDMI input terminal 1013 of the TV receiver 101, but is connected to the HDMI output terminal 1032 of the recording device 103.

In addition, because the input terminals, as well as the output terminals, are connected to each other, it is not at all possible to exchange data between the devices.

However, there has not been a system for notifying a user of the occurrence of such an erroneous connection between input terminals or between output terminals, so such conventional technology is not user friendly. In particular, it has been difficult for a user who is inexperienced in the operation of electric equipment to understand what has gone wrong.

SUMMARY OF THE INVENTION

The present invention has been conceived in view of the problems encountered with such conventional technology. The present invention provides electric equipment that has a digital interface and is capable of detecting an erroneous connection between input terminals or output terminals and notifying the user of the erroneous connection, and a method for controlling the same.

According to an aspect of the present invention, there is provided electric equipment that has an input terminal of a digital interface, the electric equipment comprising: an equipment connection detection means for detect that equipment has been connected to the input terminal; an erroneous connection detection means for execute an operation that is normally performed from an output terminal side of the digital interface to authenticate equipment connected to the output terminal as an erroneous connection detection operation on the equipment connected to the input terminal from the input terminal side, and detect an erroneous connection between input terminals if there is a response, which is expected to be received from the input terminal side during an authentication processing, from the equipment connected to the input terminal in response to the erroneous connection detection operation; and a notification means for, when an erroneous connection between input terminals has been detected by the erroneous connection detection means, give notice of the detection of the erroneous connection.

According to another aspect of the present invention, there is provided electric equipment that has an output terminal of a digital interface, the electric equipment comprising: an equipment connection detection means for detect that equipment has been connected to the output terminal; an erroneous connection detection means for execute an operation that is normally performed from an input terminal side of the digital interface to authenticate equipment connected to the input terminal as an erroneous connection detection operation on the equipment connected to the output terminal from the output terminal side, and detect an erroneous connection between output terminals in case where there is a response, which is expected to be received from the output terminal side during an authentication processing, from the equipment connected to the output terminal in response to the erroneous connection detection operation; and a notification means for give notice of the detection of the erroneous connection when an erroneous connection between output terminals has been detected by the erroneous connection detection means.

According to a further aspect of the present invention, there is provided a method for controlling electric equipment that has an input terminal of a digital interface, the method comprising the steps of: detecting that equipment has been connected to the input terminal; executing an operation that is normally performed from an output terminal side of the digital interface to authenticate equipment connected to the output terminal as an erroneous connection detection operation on the equipment connected to the input terminal from the input terminal side, and detecting an erroneous connection between input terminals if there is a response, which is expected to be received from the input terminal side during an authentication processing, from the equipment connected to the input terminal in response to the erroneous connection detection operation; and giving notice of the detection of an erroneous connection when the erroneous connection between input terminals has been detected in the erroneous connection detection step.

According to yet further aspect of the present invention, there is provided a method for controlling electric equipment that has an output terminal of a digital interface, the method comprising the steps of: detecting that equipment has been connected to the output terminal; executing an operation that is normally performed from an input terminal side of the digital interface to authenticate equipment connected to the input terminal as an erroneous connection detection operation on the equipment connected to the output terminal from the output terminal side, and detecting an erroneous connection between output terminals in case where there is a response, which is expected to be received from the output terminal side during an authentication processing, from the equipment connected to the output terminal in response to the erroneous connection detection operation; and giving notice of the detection of an erroneous connection when the erroneous connection between output terminals has been detected in the erroneous connection detection step.

Further features of the present invention will become apparent from the following description of exemplary embodiments with reference to the attached drawings.

BRIEF DESCRIPTION OF THE DRAWINGS

FIG. 2 is a diagram used to illustrate HDMI logical addresses.

FIG. 12 is a flowchart illustrating a process for detecting an erroneous connection between output terminals performed by a communication control unit according to Embodiment 4 of the present invention.

FIGS. 13A and 13B are diagrams used to illustrate a header/data block structure of a CEC message.

FIG. 14 is a diagram showing a communication configuration of a system in which a TV receiver, a repeater device such as an AV amplifier, and a recording device such as a hard disk recorder are connected with an HDMI.

DESCRIPTION OF THE EMBODIMENTS

Preferred embodiments of the present invention will now be described in detail in accordance with the accompanying drawings.

Embodiment 1

Figure 1:
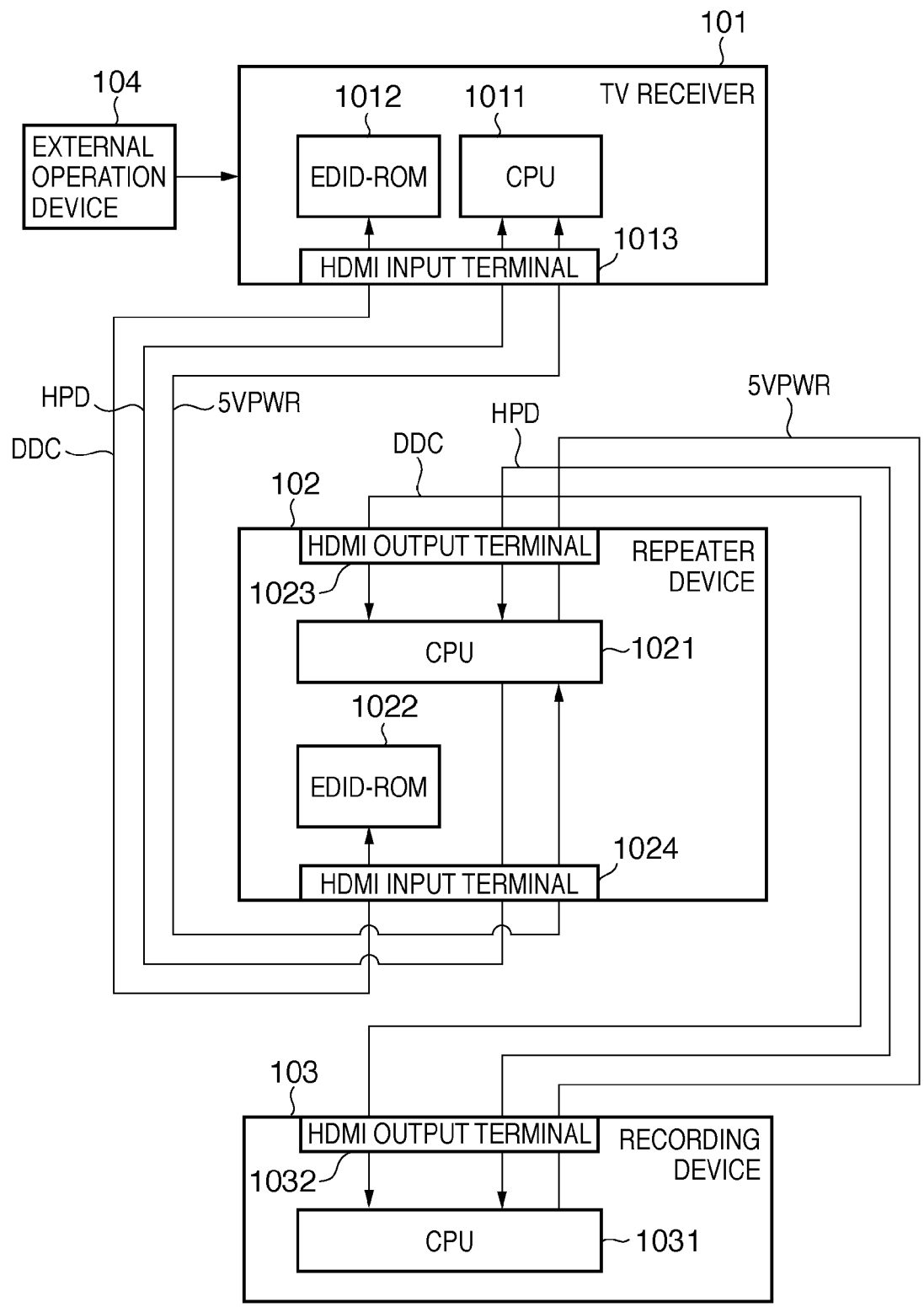
FIG. 1 is a diagram showing an example of a configuration of an AV system in which a TV receiver as an example of electric equipment according to Embodiment 1 of the present invention, a repeater device and a recording device are connected.

FIG. 1 is a diagram showing an example of a configuration of an AV system in which a TV receiver as an example of electric equipment according to Embodiment 1 of the present invention, a repeater device and a recording device are connected. In order to clearly illustrate the features of the device of the present embodiment, FIG. 1 shows a state in which input terminals, as well as output terminals, are erroneously connected. In the present specification, it is assumed that the electric equipment has a digital interface that complies with the HDMI standard (an HDMI interface), but it does not exclude the application of the present invention to electric equipment that has another digital interface.

The AV system includes a TV receiver 101, a repeater device 102, a recording device 103 and an external operation device 104.

Figure 3:
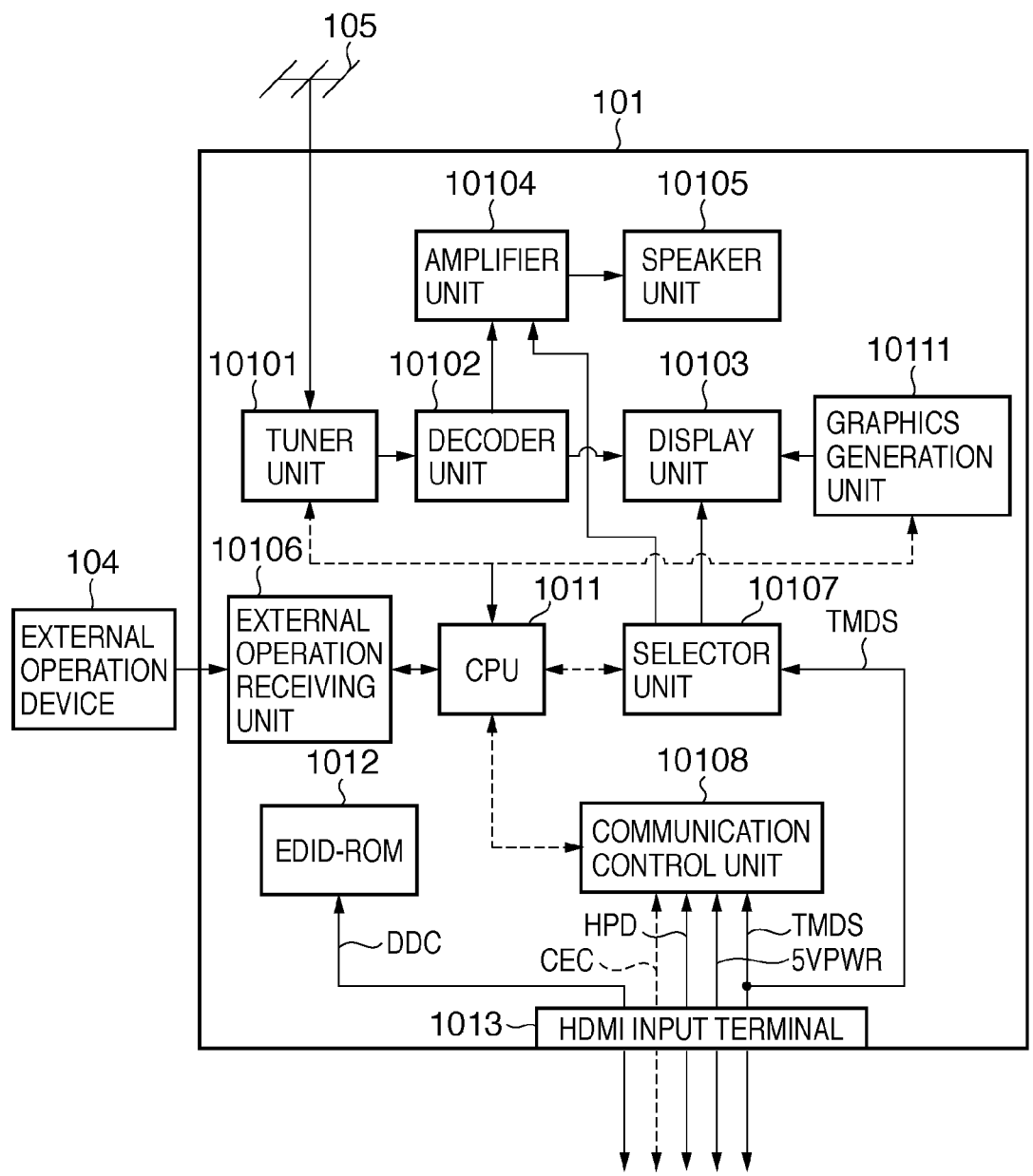
FIG. 3 is a block diagram showing an example of a configuration of the TV receiver of FIG. 1.

FIG. 3 is a block diagram showing an example of a configuration of the TV receiver 101. The TV receiver 101 includes a tuner unit 10101, a decoder unit 10102, a display unit 10103, an amplifier unit 10104 and a speaker unit 10105. The TV receiver 101 further includes an external operation receiving unit 10106, a selector unit 10107, a communication control unit 10108, an EDID-ROM 1012, a CPU 1011, a graphics generation unit 10111 and an HDMI input terminal 1013.

Figure 4:
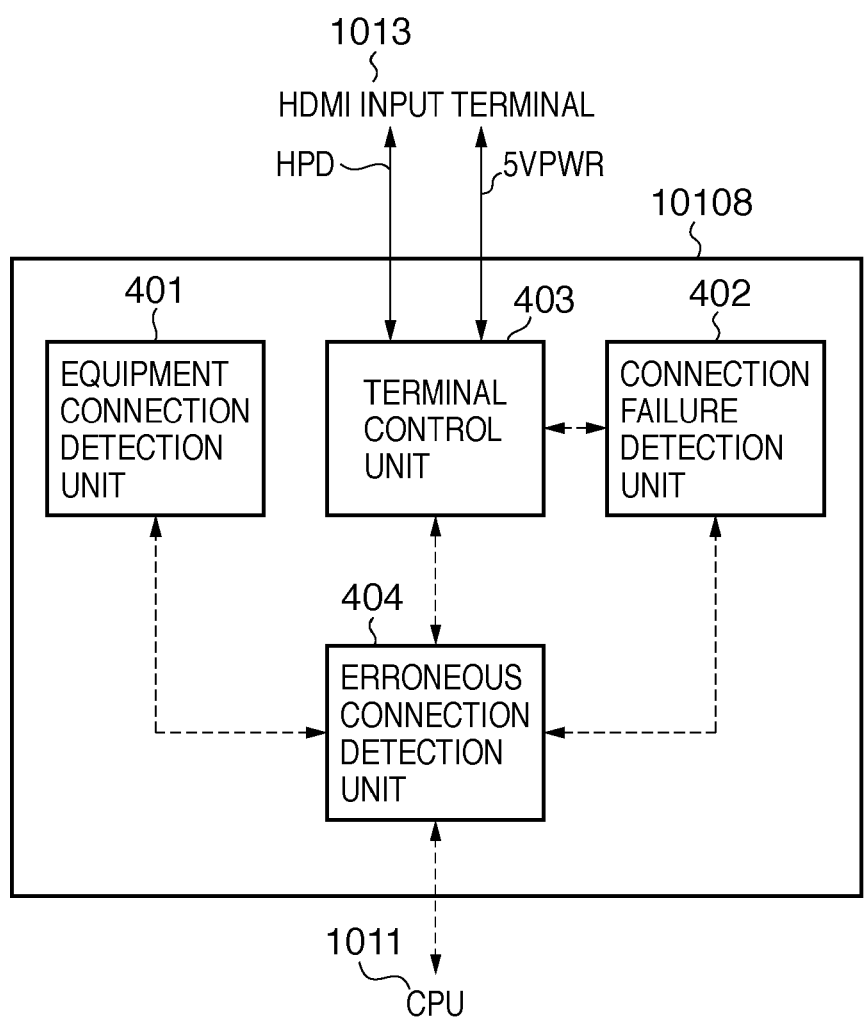
FIG. 4 is a block diagram showing an example of a configuration of a communication control unit of FIG. 3.

FIG. 4 is a block diagram showing an example of a configuration of the communication control unit 10108. The communication control unit 10108 includes an equipment connection detection unit 401, a connection failure detection unit 402, a terminal control unit 403 and an erroneous connection detection unit 404.

It is assumed that in the AV system of the present embodiment, the devices are connected with an HDMI interface. In the AV system of the present embodiment, an erroneous connection between the input terminal of the TV receiver 101 and the input terminal of the repeater device 102 caused by the user is detected. Specifically, the TV receiver 101, on behalf of a device that should have been connected to the input terminal of the repeater device 102 (the recording device 103 in this case), performs an authentication process (physical address acquisition process) with the repeater device 102. That is, the TV receiver 101 acts as the recording device 103, and detects an erroneous connection as a result of the authentication process, and notifies the user of the erroneous connection by, for example, displaying a warning.

That is, the TV receiver 101 detects the occurrence of a connection failure with connected equipment when an authentication operation that is expected to be performed on the input terminal of the TV receiver 101 by the connected equipment if the output terminal of the connected equipment is correctly connected to the input terminal of the TV receiver 101 is not performed. When a connection failure is detected, the TV receiver 101 executes an operation that is normally performed from the output terminal during authentication processing on the connected equipment from the input terminal as an erroneous connection detection operation, and detects an erroneous connection between input terminals if there is a proper response from the connected equipment in response to the erroneous connection detection operation.

An operation performed when the input terminals and output terminals of the AV system shown in FIG. 1 are correctly connected (connected as shown in FIG. 14) will be described. In this case, the HDMI output terminal 1032 of the recording device 103 brings the 5VPWR line to a high voltage level for the HDMI input terminal 1024 of the repeater device 102. This is an authentication process performed by the recording device 103 for acquiring a physical address from the EDID-ROM 1022 of the repeater device 102 through DDC communication. Subsequently, the repeater device 102 performs an authentication process by bringing the HPD line of the HDMI input terminal 1024 to a high voltage level.

However, the HDMI input terminal 1024 of the repeater device 102 of FIG. 1 is connected to the HDMI input terminal 1013 of the TV receiver 101. Accordingly, the TV receiver 101, on behalf of the recording device 103, performs an authentication process with the HDMI input terminal 1024 of the repeater device 102.

TV Receiver 101

Hereinafter, the TV receiver 101 of the present embodiment will be described in detail.

Tuner Unit

A television broadcast signal received by an antenna 105 of FIG. 3 is input into the tuner unit 10101. The tuner unit 10101 obtains information on a channel to be received (frequency, TS_ID) from the CPU 1011, switches the frequency and outputs a desired TS (transport stream). This TS data is descrambled using the MULTI2 scrambling method (see ARIB STD-B25 Chapter 3 for the details), and after that, demultiplexed into a PES (Packetized Elementary Streams) packet and section data.

The PES packet includes an MPEG-2 audio stream, video stream, and so on. Likewise, the section data includes PSI (Program Specific Information) for transmitting program information, carousel data for data broadcast, and so on. The video stream and audio stream data are output to the decoder unit 10102, and SI (Service Information) that is necessary to obtain program information is acquired from the PSI section and stored in the CPU 1011.

Decoder Unit, Display Unit, Amplifier Unit, Speaker Unit, and Selector Unit

The decoder unit 10102 performs a video decoding process that complies with a standard (see ARIB STD-B21 Chapter 6, 6.1 "Video Decoding Process And Output") on the video stream data, and outputs the resultant to the display unit 10103. The display unit 10103 equipped with a display panel of any type displays the video stream from the decoder unit 10102.

The decoder unit 10102 also performs an audio decoding process that complies with a standard (see ARIB STD-B21 Chapter 6, 6.2 "Audio Decoding Process And Output") on the audio video stream data, and outputs the resultant to the amplifier unit 10104. The amplifier unit 10104 amplifies the audio signal, and outputs the amplified signal from the speaker unit 10105.

Video data and audio data played back by the recording device 103 are transmitted through a TDMS channel, switched by the selector unit 10107, and output to the display unit 10103 and the amplifier unit 10104, respectively. The switching of the selector unit 10107 is controlled by the CPU 1011.

External Operation Device, and External Operation Receiving Unit

An instruction from the user to the TV receiver 101 is entered through the external operation device 104 such as a remote controller, and an operation signal indicative of an instructed operation is received by the external operation receiving unit 10106. The received operation signal is detected by the CPU 1011. An instruction for the operation of the recording device 103 can also be entered from the external operation device 104 via the TV receiver 101.

The CPU 1011 controls the communication control unit 10108 based on the received user instruction so as to produce a CEC message such as a sound volume control message or recording message and send the message to the repeater device 102 and the recording device 103.

A CEC message sent from the repeater device 102 or the recording device 103 is received by the communication control unit 10108, and sent to the CPU 1011, where the message is analyzed.

Communication Control Unit, and EDID-ROM

The acquisition of a physical address will be described first.

The communication control unit 10108 sends a response upon receiving a request to acquire a physical address (to bring the 5VPWR line from a low voltage level to a high voltage level) from the repeater device 102. The communication control unit 10108 responds by bringing the HPD line from a low voltage level to a high voltage level in the case of the acquisition request being permitted, or by maintaining the HPD line at a low voltage level in the case of the acquisition request not being permitted.

Usually, when the acquisition of a physical address is permitted, the repeater device 102 performs DDC communication with the EDID-ROM 1012 to acquire a physical address. The physical address is assigned to each HDMI terminal of the TV receiver 101, and stored in the EDID-ROM 1012. However, it is also possible that an EDID-ROM 1012 is provided for each HDMI terminal, or a single EDID-ROM may perform switching and return a plurality of physical addresses if possible.

The acquisition of a logical address will be described next.

The repeater device 102 acquires a logical address that it wants to acquire from among the logical addresses assigned to each device type. As described above with reference to FIG. 2, available logical addresses are preset: For example, "5" is assigned to an audio system, or in other words, the repeater device, and "1", "2" and "9" are assigned to recording devices.

As a procedure for acquiring a logical address, as described above, the repeater device 102 broadcasts a Polling message to a logical address (e.g., "5") that the repeater device 102 wants to acquire. If there is no response to the Polling message from any other device (if a message with ACK bit=1 that was sent is returned without any changes), it means that the logical address is not used, and the repeater device 102 acquires the logical address. The details of this acquisition method are written in the above-mentioned "High-Definition Multimedia Interface Specification Version 1.3a".

FIGS. 13A and 13B are diagrams illustrating a block structure of a CEC message.

All data blocks and a header block of a CEC message have the same basic structure with a bit length of 10 bits. FIG. 13A shows the structure of a header/data block. There are 8 bits as information bits, in which data, an operation code, an address, and the like are stored. As control bits, there are EOM (End of Message) and ACK (Acknowledge) fields, each comprising one bit, in each block. EOM indicates whether or not there is a succeeding block that needs to be transmitted. "0" indicates that there is a succeeding block, and "1" indicates that it is the last block. ACK is a response from a transmission destination device. If the message is accepted, "0" is set, and otherwise, "1" is set. FIG. 13B shows the structure of a header block. In the header block, 8 information bits are divided into two groups each including 4 bits, and Initiator and Destination are set for the groups, respectively. A logical address of a message sending side device (TV receiver 101 in the present embodiment) is set in the Initiator, and a logical address of a receiving side device (e.g., repeater device 102) is set in the Destination.

Accordingly, for example, in the Polling message described above, if the Destination address is set to "5" as a logical address of a receiving side device, and there is equipment that has already acquired the logical address "5", the ACK bit is set to "0". In actuality, a CEC line that has been brought to a high voltage level on the Initiator side is lowered to a low voltage level on the Destination side, and such an operation is represented by "0" in the ACK bit. By doing so, the presence of a device that has acquired the logical address "5" can be detected.

Similarly, in the Give Physical Address message, if the Destination address is set to "5", for example, as a logical address of a receiving side device, the following response is obtained. That is, when there is a device that has already acquired the logical address "5", the ACK bit is set to "0", and the physical address of the device whose logical address is "5" is sent with a message as a response. By doing so, the presence of a device that has acquired the logical address "5" and the physical address of the device can be detected.

If a device that has acquired the queried (requested) logical address is not found, the ACK bit of the message block of the Polling message or the Give Physical Address message is set to "1". As described above, in actuality, the CEC line that has been brought to a high voltage level on the Initiator side is maintained at the high voltage level.

In the foregoing, the acquisition of a physical address and the acquisition of a logical address and the CEC communication performed by the communication control unit 10108 have been described. Next, a process for detecting an erroneous connection between input terminals will be described below.

Detection of Erroneous Connection between Input Terminals

An erroneous connection between input terminals is detected by the communication control unit 10108. Accordingly, the communication control unit 10108 includes, as shown in FIG. 4, the equipment connection detection unit 401, the connection failure detection unit 402, the terminal control unit 403 and the erroneous connection detection unit 404. In FIG. 4, signal lines that have nothing to do with the detection of an erroneous connection between input terminals are omitted.

Figure 5:
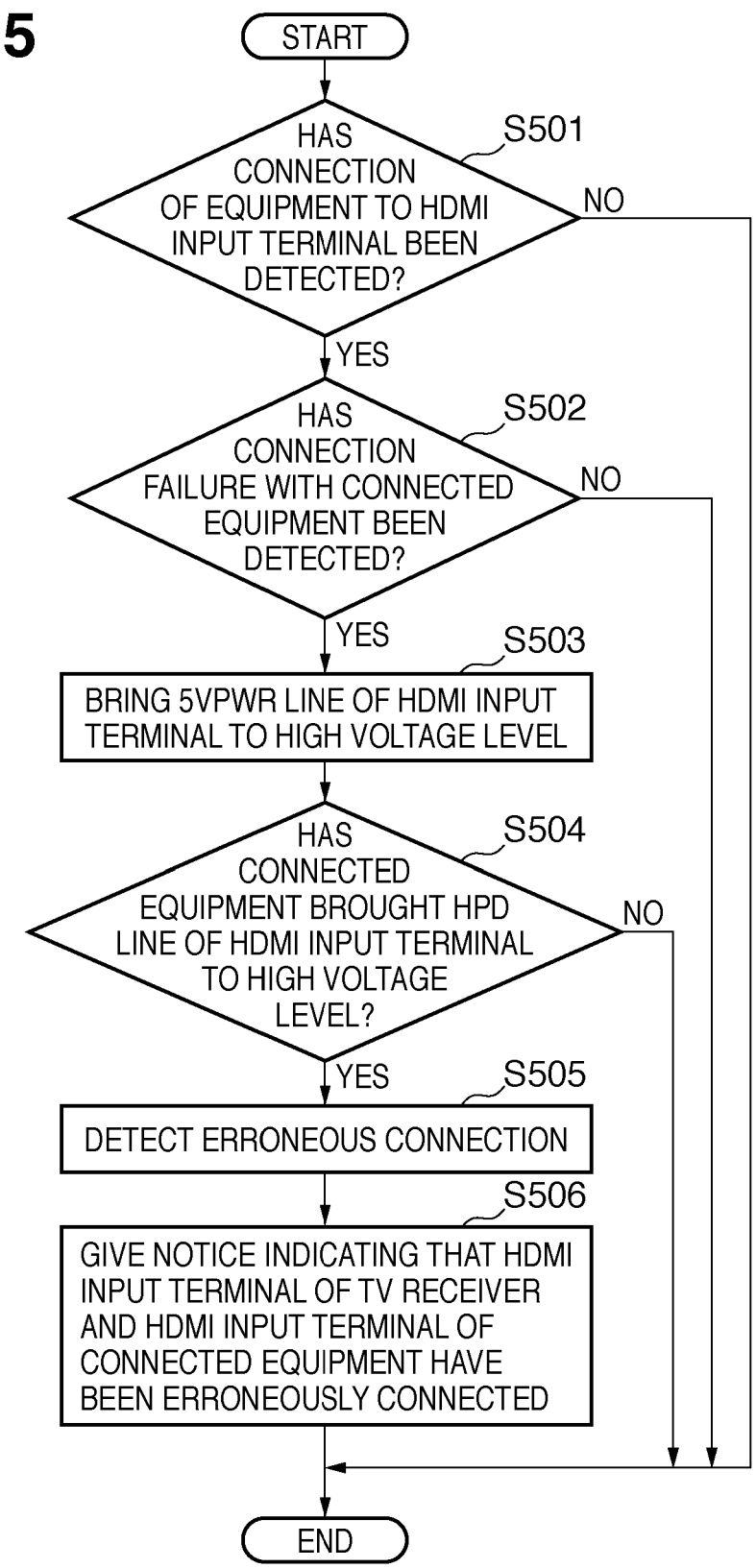
FIG. 5 is a flowchart illustrating a process for detecting an erroneous connection between input terminals performed by a communication control unit according to Embodiment 1 of the present invention.

A process for detecting an erroneous connection between input terminals performed by the communication control unit 10108 will be described with reference to the flowchart shown in FIG. 5 as well. By way of example, a case will be described in which an erroneous connection between the HDMI input terminal 1024 of the repeater device 102 and the HDMI input terminal 1013 of the TV receiver 101 is detected.

The equipment connection detection unit 401 detects the insertion and removal of an HDMI cable connector into and out of the HDMI input terminal 1013 with, for example, a mechanical contact (not shown) so as to detect whether or not equipment has been connected to the HDMI input terminal 1013 of the TV receiver 101 (step S501).

A physical address is preset for each HDMI terminal. Accordingly, the equipment connection detection unit 401, when mounted to the TV receiver 101, which has a plurality of HDMI terminals, can detect the physical address of a device that has been connected, or the physical address of a device that has been disconnected. The equipment connection detection unit 401 can also detect the number of physical addresses in use (the number of pieces of equipment connected).

In step S501, if the equipment connection detection unit 401 detects that equipment has been connected to the HDMI input terminal 1013 of the TV receiver 101, the connection failure detection unit 402 starts measuring time. Then, if the connected equipment (the repeater device 102) does not bring the 5VPWR line to a high voltage level for a predetermined period of time, the connection failure detection unit 402 detects a connection failure (step S502). As described above, in the present embodiment, even when connected equipment has been detected, if an expected authentication operation is not performed by the connected equipment (e.g., if an expected signal is not input), a connection failure is detected, and an erroneous connection detection process is performed.

If the equipment connection detection unit 401 detects in step S501 that equipment has been connected to the HDMI input terminal 1013 of the TV receiver 101, and the connection failure detection unit 402 detects a connection failure with the connected equipment in step S502, the process from step S503 is performed to detect an erroneous connection between input terminals. Thus, the process for detecting an erroneous connection can be performed only when there is a high possibility of a connection failure. However, the process for detecting an erroneous connection between input terminals described below may be performed once when starting up the TV receiver 101, or may be performed regularly each time it is detected that equipment has been connected to an HDMI terminal of the TV receiver 101 regardless of the possibility of a connection failure.

Process for Detecting Erroneous Connection Between Input Terminals

The erroneous connection detection unit 404 controls the terminal control unit 403 to bring the 5VPWR line to a high voltage level (step S503). In this case, the 5VPWR line of the HDMI input terminal 1013 of the TV receiver 101 of FIG. 1 is brought to a high voltage level.

As described above, when a connection failure is detected, the TV receiver 101 of the present embodiment performs an authentication operation that was expected but not performed by the connected equipment (an authentication process (request process) for acquiring a physical address in this example) on the connected equipment. This corresponds to the TV receiver 101 acting as the equipment (e.g., the recording device 103) that should have been connected to the HDMI terminal of the connected equipment (the HDMI input terminal 1024 of the repeater device 102) that is connected to the TV receiver 101 in FIG. 1.

In other words, the TV receiver 101 of the present embodiment detects the occurrence of a connection failure with connected equipment when an authentication operation that is expected to be performed on the input terminal of the TV receiver 101 by the connected equipment if the output terminal of the connected equipment is correctly connected to the input terminal of the TV receiver 101 is not performed. When a connection failure is detected, the input terminal executes an operation that is normally performed by the output terminal during authentication processing on the connected equipment as an erroneous connection detection operation.

Then, the erroneous connection detection unit 404 detects, via the terminal control unit 403, whether or not the connected equipment (the repeater device 102) has brought the HPD line of the HDMI input terminal 1013 to a high voltage level as a response (step S504). If it is detected that the HPD line has been brought to a high voltage level, the erroneous connection detection unit 404 can detect that the HDMI input terminal of the connected equipment is connected to the HDMI input terminal 1013 of the TV receiver 101, or in other words, it can detect an erroneous connection between input terminals (step S505). This is because a change in the voltage level of the HPD line can be deemed as an operation performed by the repeater device 102 as a response to the recording device 103 connected to the HDMI input terminal 1024 of the repeater device 102 bringing the 5VPWR line to a high voltage level.

Subsequently, the CPU 1011 is notified of the erroneous connection between input terminals detected by the erroneous connection detection unit 404. Then, the CPU 1011 controls, for example, the graphics generation unit 10111 so as to produce (or read out from a non-volatile memory (not shown)) a message notifying the user of the erroneous connection between input terminals, and displays the message on the display unit 10103 (step S506). The notification method is not limited to displaying a visual message, and can be any method such as outputting an audio message from the speaker unit 10105.

In the present embodiment, no special processes are performed in the following cases:

when it is not detected in step S501 that equipment has been connected to the HDMI input terminal 1013 of the TV receiver 101, when a connection failure with the connected equipment is not detected in step S502, and when it is not detected in step S504 that the HPD line of the HDMI input terminal has been brought to a high voltage level.

As described thus far, according to the present embodiment, even when it is detected that equipment has been connected to the input terminal, if it is detected that an authentication operation that is expected to be performed by the connected equipment is not performed, the expected authentication operation is performed on the connected equipment. If the connected equipment returns a proper response, it is detected that the input terminals have been erroneously connected, and the user is notified of the erroneous connection.

That is, the TV receiver 101 detects a connection failure with connected equipment when an authentication operation that is expected to be performed on the input terminal of the TV receiver 101 by the connected equipment if the output terminal of the connected equipment is correctly connected to the input terminal of the TV receiver 101 is not performed. When a connection failure is detected, the TV receiver 101 executes an operation that is normally performed by the output terminal during authentication processing on the connected equipment from the input terminal as an erroneous connection detection operation, detects an erroneous connection between input terminals if there is a proper response from the connected equipment in response to the erroneous connection detection operation, and notifies the user of the erroneous connection.

Accordingly, the user can be made aware of the fact that the input terminals have been erroneously connected, so the user can immediately take appropriate action (reconnecting the terminals).

In the present embodiment, an example of detecting that the input terminal of connected equipment is erroneously connected to the input terminal of a TV receiver has been described, but it is needless to say that the present embodiment is not limited to the TV receiver, and even when another device is used, the occurrence of an erroneous connection can be detected and the user can be notified as with the present embodiment.

Embodiment 2

Embodiment 2 of the present invention will be described next.

Embodiment 2 assumes that the power of the repeater device 102 of Embodiment 1 is off (technically, the repeater device 102 is in a standby state). When the power of the repeater device 102 is off, even if the 5VPWR line is brought to a high voltage level for the repeater device 102 to detect an erroneous connection, the repeater device 102 cannot bring the HPD line to a high voltage level. Accordingly, an erroneous connection between input terminals cannot be detected with the method described in Embodiment 1.

To address this, in Embodiment 2, when connected equipment (the repeater device 102) does not bring the HPD line to a high voltage level after the 5VPWR has been brought to a high voltage level for the connected equipment to detect an erroneous connection, the power of the connected equipment is turned on, and then, detection of an erroneous connection between input terminals is performed.

This is effected by utilizing what is called a "tandem power-on function" that is usually included in the repeater device 102 and the recording device 103, with which the power can be turned on in response to a message to turn on the power even when the power is off. Specifically, equipment connected with an HDMI can be turned on using a CEC power-on message.

The configuration of an AV system of the present embodiment is the same as that of Embodiment 1 (FIG. 1), and a TV receiver of the present embodiment is the same as that of Embodiment 1 except that the configuration and operation of a communication control unit 10108 are different from those of Embodiment 1. Accordingly, only the configuration and operation of the communication control unit 10108 of the present embodiment will be described below.

Figure 6:
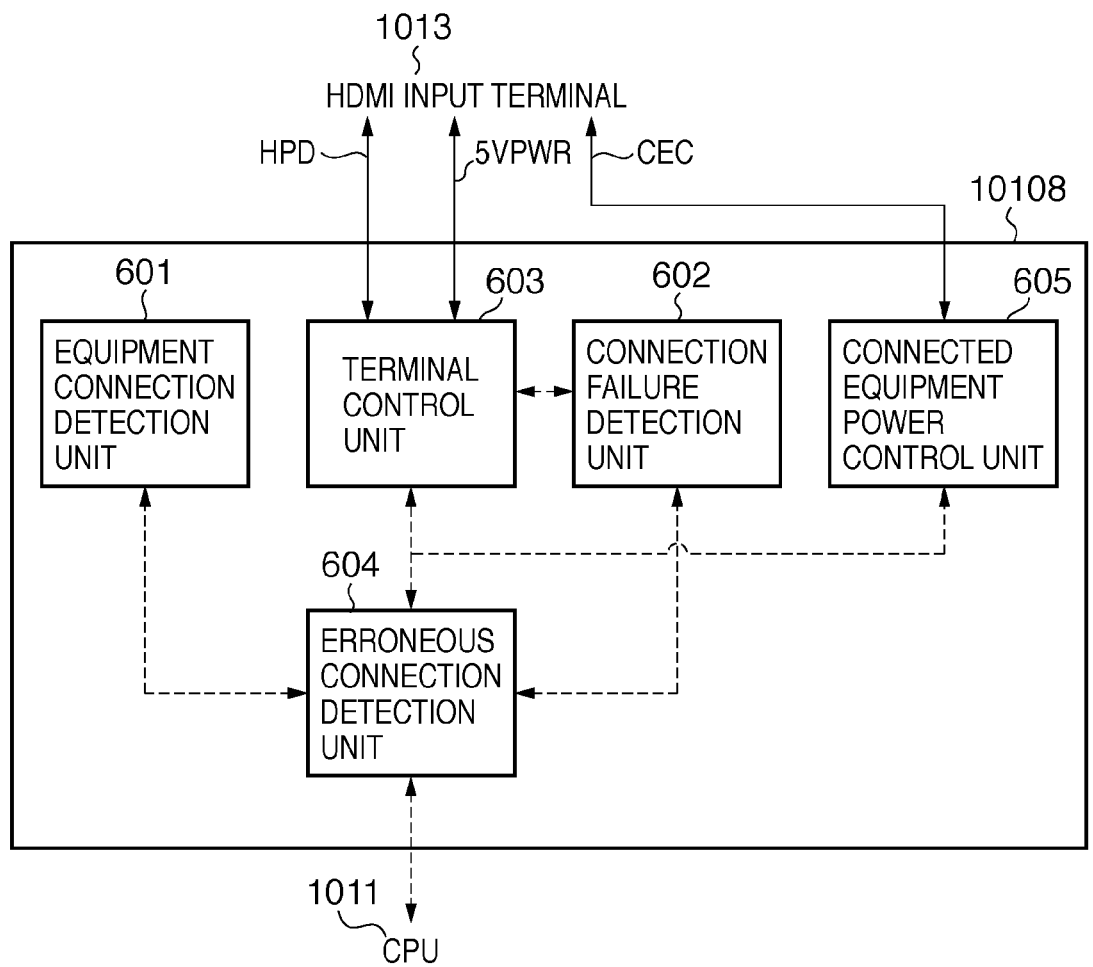
FIG. 6 is a block diagram showing an example of a configuration of a communication control unit of a TV receiver according to Embodiment 2 of the present invention.

FIG. 6 is a block diagram showing an example of a configuration of the communication control unit 10108 of the present embodiment. The communication control unit 10108 includes an equipment connection detection unit 601, a connection failure detection unit 602, a terminal control unit 603, an erroneous connection detection unit 604 and a connected equipment power control unit 605.

Figure 7:
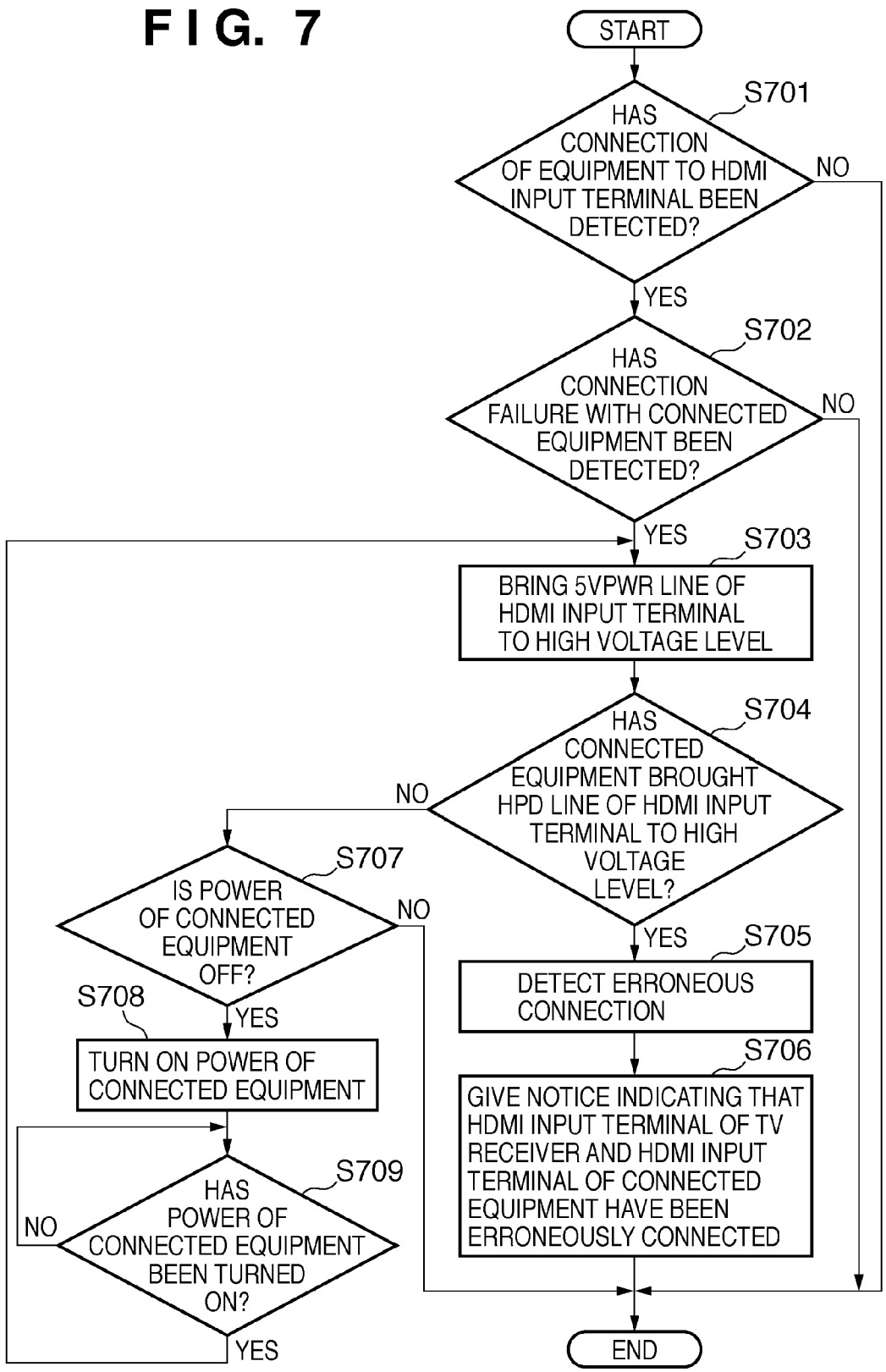
FIG. 7 is a flowchart illustrating a process for detecting an erroneous connection between input terminals performed by a communication control unit according to Embodiment 2 of the present invention.

FIG. 7 is a flowchart illustrating a process for detecting an erroneous connection between input terminals performed by the communication control unit 10108 of the present embodiment.

The equipment connection detection unit 601 detects the insertion and removal of an HDMI cable connector into and out of the HDMI input terminal 1013 with, for example, a mechanical contact (not shown) so as to detect whether or not equipment has been connected to the HDMI input terminal 1013 of the TV receiver 101 (step S701).

In step S701, if the equipment connection detection unit 601 detects that equipment has been connected to the HDMI input terminal 1013 of the TV receiver 101, the connection failure detection unit 602 starts measuring time. Then, if the connected equipment (the repeater device 102) does not bring the 5VPWR line to a high voltage level for a predetermined period of time, the connection failure detection unit 602 detects a connection failure (step S702).

The erroneous connection detection unit 604 controls the terminal control unit 603 capable of input and output so as to bring the 5VPWR line to a high voltage level (step S703). In this case, the 5VPWR line of the HDMI input terminal 1013 of the TV receiver 101 of FIG. 1 is brought to a high voltage level.

As described above, when a connection failure is detected, the TV receiver 101 of the present embodiment performs an authentication operation that was expected but not performed by the connected equipment (an authentication process (request process) for acquiring a physical address in this example) on the connected equipment. This corresponds to the TV receiver 101 acting as the equipment (e.g., the recording device 103) that should have been connected to the HDMI terminal of the connected equipment (the HDMI input terminal 1024 of the repeater device 102) that is currently connected to the TV receiver 101.

In other words, the TV receiver 101 of the present embodiment detects a connection failure with connected equipment when an authentication operation that is expected to be performed on the input terminal of the TV receiver 101 by the connected equipment if the output terminal of the connected equipment is correctly connected to the input terminal of the TV receiver 101 is not performed. When a connection failure is detected, the TV receiver 101 executes an operation that is normally performed from the output terminal during authentication processing on the connected equipment from the input terminal as an erroneous connection detection operation.

Then, the erroneous connection detection unit 604 detects, via the terminal control unit 603, whether or not the connected equipment (the repeater device 102) has brought the HPD line of the HDMI input terminal 1013 to a high voltage level as a response (step S704). If it is detected that the HPD line has been brought to a high voltage level, it can be deemed that the repeater device 102 has brought the HPD line to a high voltage level in response to the TV receiver 101 connected to the HDMI input terminal 1024 of the repeater device 102 bringing the 5VPWR line to a high voltage level. That is, it can be detected that the HDMI input terminal of the connected equipment is connected to the HDMI input terminal 1013 of the TV receiver 101, or in other words, an erroneous connection between input terminals can be detected (step S705).

Subsequently, the CPU 1011 is notified of the erroneous connection between input terminals detected by the erroneous connection detection unit 604. Then, the CPU 1011 controls, for example, the graphics generation unit 10111 so as to produce (or read out from a non-volatile memory (not shown)) a message notifying the user of the erroneous connection between input terminals, and displays the message on the display unit 10103 (step S706). The notification method is not limited to displaying a visual message, and can be any method such as outputting an audio message from the speaker unit 10105.

If, on the other hand, the repeater device 102 does not bring the HPD line to a high voltage level despite the fact that the 5VPWR line of the HDMI input terminal 1013 has been brought to a high voltage level in step S704, it is highly likely that the power of the repeater device 102 is off.

Accordingly, the erroneous connection detection unit 604 checks the power status of the connected equipment (the repeater device 102) (step S707). Specifically, the erroneous connection detection unit 604 controls the connected equipment power control unit 605 so as to send a CEC message (e.g., Give Device Power Status message) to check the power status of the repeater device 102. If there is a response that indicates that the power is off (the repeater device 102 is on standby) from the repeater device 102 in response to the CEC message, the erroneous connection detection unit 604 turns on the power of the connected equipment (the repeater device 102). Specifically, the erroneous connection detection unit 604 controls the connected equipment power control unit 605 so as to send a CEC message (e.g., User Control Pressed message in which Power is specified as a parameter) to turn on the power of the repeater device 102 (step S708).

Then, the erroneous connection detection unit 604 again checks whether the power of the repeater device 102 has been turned on by sending a CEC message to check the power status to the repeater device 102 through the connected equipment power control unit 605 (step S709). This CEC message may be the same as that used to check the power status of the repeater device 102 in step S707. If there is a response that indicates that the power has been turned on from the repeater device 102 in response to the CEC message, and it is confirmed that the power of the repeater device 102 is on, the process from step S703 is performed again. If there is no response that indicates that the power has been turned on from the repeater device 102, the erroneous connection detection unit 604 periodically sends a message to check the power status to the repeater device 102 through the connected equipment power control unit 605.

Note, however, that no special processes are performed in the following cases:

when it is not detected in step S701 that equipment has been connected to the HDMI input terminal of the TV receiver 101, when a connection failure with the connected equipment is not detected in step S702, and when the power of the connected equipment is on in step S705.

As described above, according to the present embodiment, even when it is detected that equipment has been connected to the input terminal, if it is detected that an authentication operation that is expected to be performed by the connected equipment is not performed, the expected authentication operation is performed on the connected equipment. At this time, if there is no proper response from the connected equipment, the power status of the connected equipment is checked. When the power is off, the power of the connected equipment is turned on and, then, the expected authentication operation is executed again. If the connected equipment returns a proper response, it is detected that the input terminals have been erroneously connected, and the user is notified of the erroneous connection.

Accordingly, in addition to the effects of Embodiment 1, even when the power of the connected equipment is off (the connected equipment is in a standby state), the user can be aware of the fact that input terminals have been erroneously connected, so the user can immediately take appropriate action (reconnecting the terminals).

Embodiment 3

Embodiment 3 of the present invention will be described next.

Embodiment 1 was described in the context where the TV receiver 101 detects an erroneous connection between the input terminal of the TV receiver 101 and the input terminal of the repeater device 102, whereas the present embodiment will be described in the context where the recording device 103 detects an erroneous connection between the output terminal of the recording device 103 and the output terminal of the repeater device.

That is, in the AV system of the present embodiment, the recording device 103, on behalf of a device that should have been connected to the output terminal of the repeater device 102 (the TV receiver 101 in this case), performs an authentication process (physical address acquisition process) with the repeater device 102. In other words, the recording device 103 acts as the TV receiver 101. Then, the recording device 103 detects an erroneous connection between output terminals as a result of the authentication process, and notifies the user of the erroneous connection by, for example, displaying a warning.

In other words, the recording device 103 of the present embodiment detects the occurrence of a connection failure with connected equipment when an authentication operation that is expected to be performed on the output terminal of the recording device 103 by the connected equipment if the input terminal of the connected equipment is correctly connected to the output terminal of the recording device 103 is not performed. When a connection failure is detected, the recording device 103 executes an operation that is normally performed from the input terminal during authentication processing on the connected equipment from the output terminal as an erroneous connection detection operation. If there is a proper response from the connected equipment in response to the erroneous connection detection operation, the recording device 103 detects that the output terminals have been erroneously connected, and notifies the user of the erroneous connection.

The AV system of the present embodiment includes, as in that of Embodiment 1 (FIG. 1), a TV receiver 101, a repeater device 102, a recording device 103 and an external operation device 104.

However, in the present embodiment, the configuration and operation of the recording device 103 is different from that of other embodiments, and thus, the recording device 103 will be described below.

Figure 8:
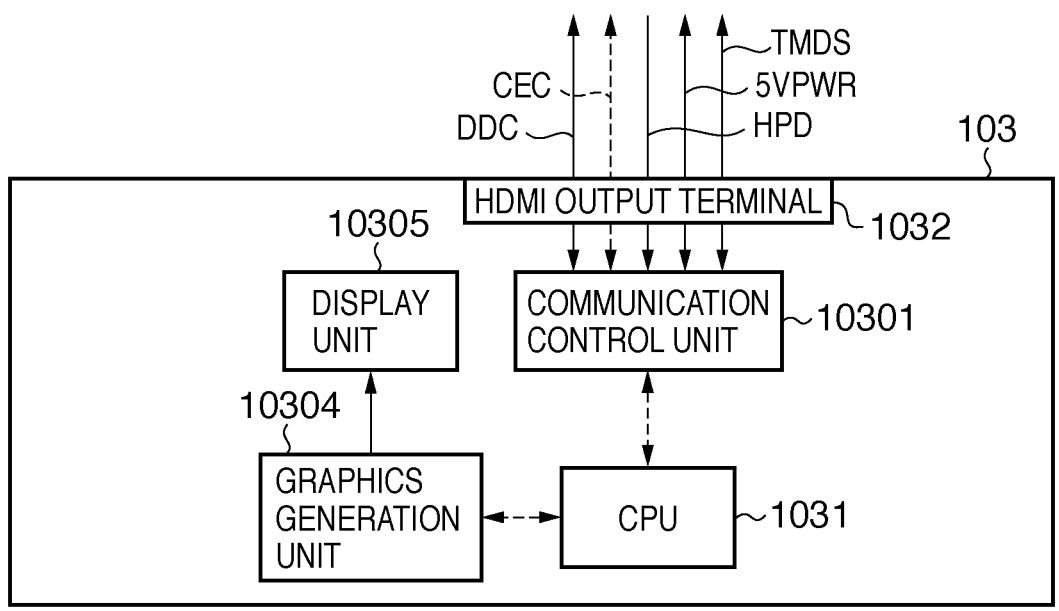
FIG. 8 is a block diagram showing an example of a configuration of a recording device according to Embodiment 3 of the present invention.

FIG. 8 is a block diagram showing an example of a configuration of the recording device 103 of the present embodiment. The recording device 103 includes a communication control unit 10301, an HDMI output terminal 1032, a CPU 1031, a graphics generation unit 10304 and a display unit 10305.

Figure 10:
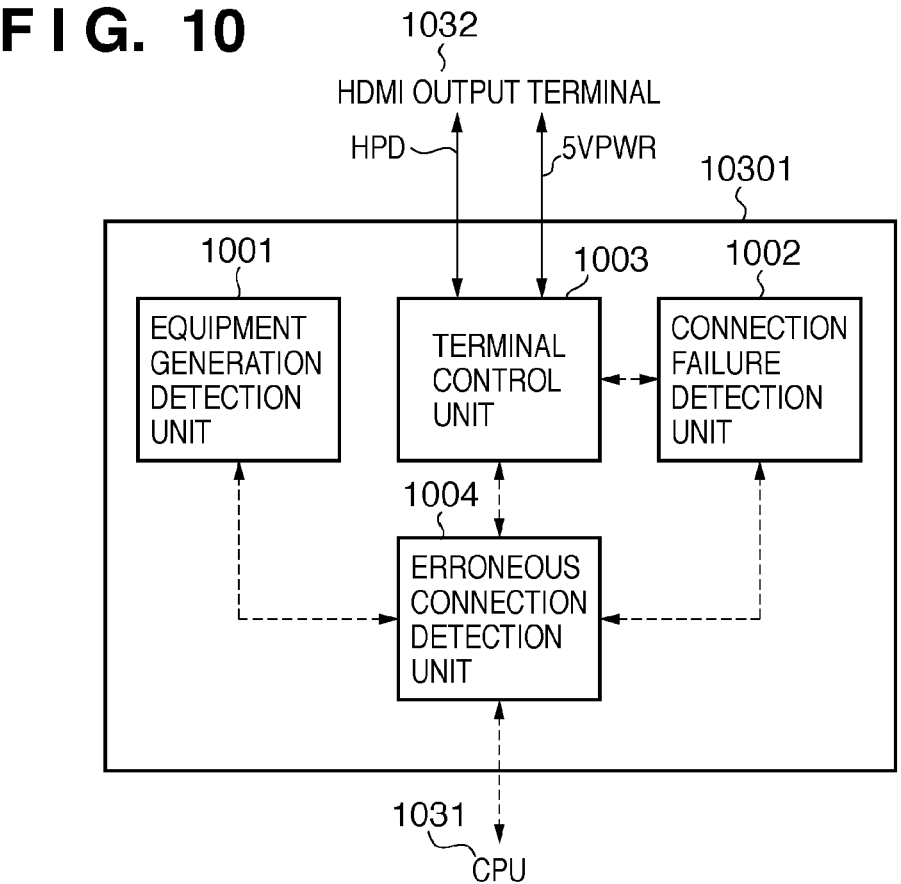
FIG. 10 is a block diagram showing an example of a configuration of a communication control unit according to Embodiment 3 of the present invention.

FIG. 10 is a block diagram showing an example of a configuration of the communication control unit 10301 of the present embodiment. The communication control unit 10301 includes an equipment connection detection unit 1001, a connection failure detection unit 1002, a terminal control unit 1003 and an erroneous connection detection unit 1004.

Figure 9:
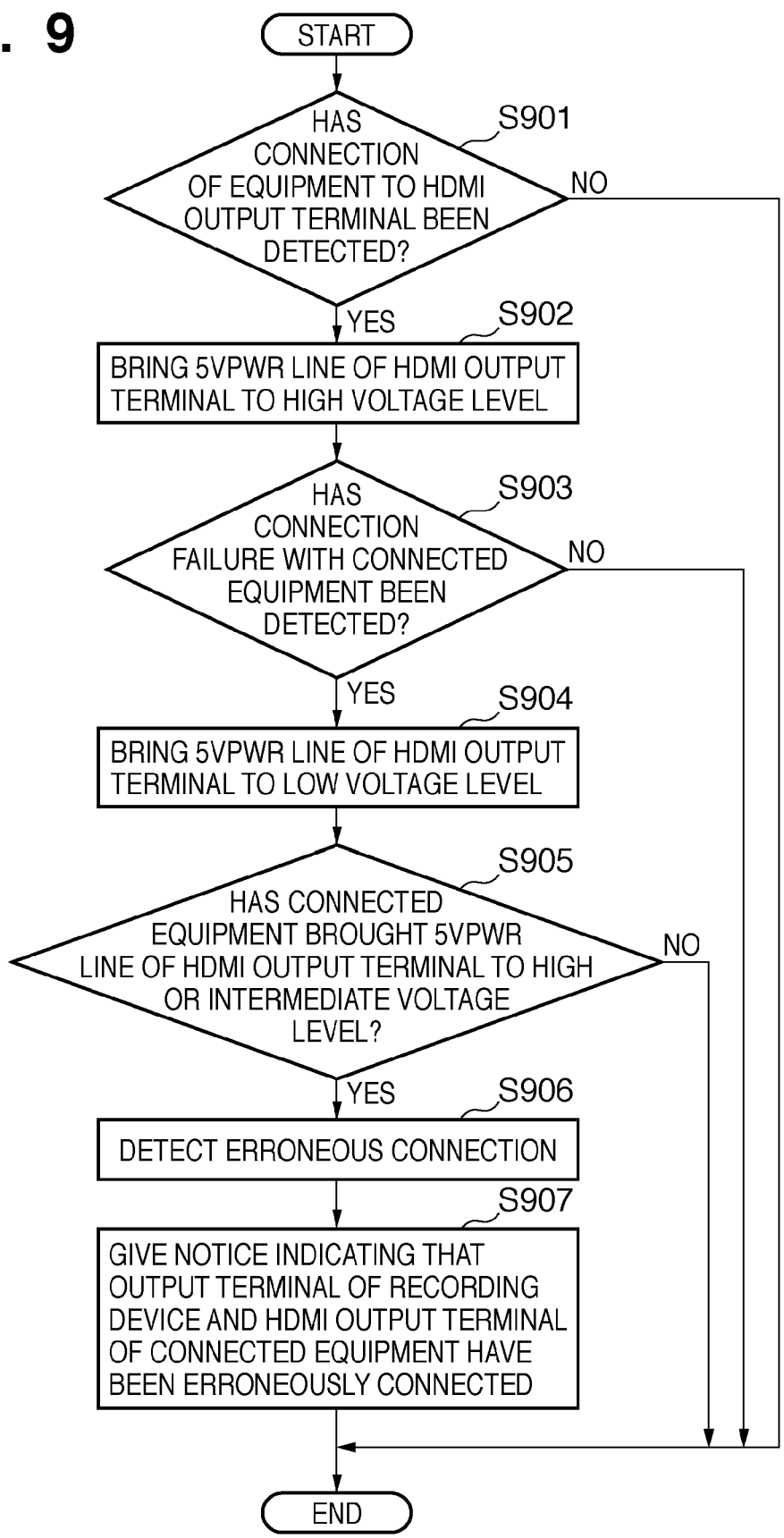
FIG. 9 is a flowchart illustrating a process for detecting an erroneous connection between output terminals performed by a communication control unit according to Embodiment 3 of the present invention.

FIG. 9 is a flowchart illustrating a process for detecting an erroneous connection between output terminals performed by the communication control unit 10301 of the present embodiment.

Hereinafter, a process for detecting an erroneous connection between output terminals performed by the recording device of the present embodiment will be described with reference to the block diagrams of FIGS. 8 and 10 and the flowchart of FIG. 9.

The equipment connection detection unit 1001 detects the insertion and removal of an HDMI cable connector into and out of the HDMI output terminal 1032 with, for example, a mechanical contact (not shown) so as to detect whether or not equipment has been connected to the HDMI output terminal 1032 of the recording device 103 (step S901).

In step S901, if the equipment connection detection unit 1001 detects that equipment has been connected to the HDMI output terminal 1032 of the recording device 103, the connection failure detection unit 1002 controls the terminal control unit 1003 so as to bring the 5VPWR line to a high voltage level, and starts measuring time (step S902). Then, if the connected equipment (the repeater device 102) does not bring the HPD line to a high voltage level for a predetermined period of time after the 5VPWR line has been brought to a high voltage level, the connection failure detection unit 1002 detects a connection failure (step S903).

If the equipment connection detection unit 1001 detects in step S901 that equipment has been connected to the HDMI output terminal 1032 of the recording device 103, and the connection failure detection unit 1002 detects a connection failure with the connected equipment in step S903, the process from step S904 is performed to detect an erroneous connection between output terminals. Thus, the process for detecting an erroneous connection can be performed only when there is a high possibility of a connection failure. However, the process for detecting an erroneous connection between output terminals described below may be performed once when starting up the recording device 103, or may be performed regularly each time it is detected that equipment has been connected to an HDMI terminal of the recording device 103 regardless of the possibility of a connection failure.

If the connection failure detection unit 1002 detects a connection failure in step S903, the erroneous connection detection unit 1004 controls the terminal control unit 1003 capable of input and output so as to bring the 5VPWR line of the HDMI output terminal 1032 to a low voltage level (step S904).

This corresponds to the recording device 103 acting as the equipment (e.g., the TV receiver 101) that should have been connected to the HDMI terminal of the connected equipment (the HDMI output terminal 1023 of the repeater device 102) that is currently connected to the recording device 103.

Subsequently, the erroneous connection detection unit 1004 detects whether the 5VPWR line of the HDMI output terminal 1032 has been brought to a high or intermediate voltage level (step S905).

When it is detected that the 5VPWR line of the HDMI output terminal 1032 has been brought to a high or intermediate voltage level, the erroneous connection detection unit 1004 can detect that output terminals have been erroneously connected (step S906). Specifically, the erroneous connection detection unit 1004 can detect that the HDMI output terminal of connected equipment has been connected to the HDMI output terminal 1032. This is because a change in the voltage level of the 5VPWR line can be deemed as an operation performed by the repeater device 102 as a request to start DDC communication with the EDID-ROM 1012 to the TV receiver 101 connected to the HDMI output terminal 1023 of the repeater device 102. The reason why the 5VPWR line is raised to an intermediate voltage level is that the 5VPWR line of the HDMI output terminal 1023 of the repeater device 102 is held at a high voltage level, and the 5VPWR line of the HDMI output terminal 1032 of the recording device 103 is held at a low voltage level.

Subsequently, the CPU 1031 is notified of the erroneous connection between output terminals detected by the erroneous connection detection unit 1004. Then, the CPU 1031 controls, for example, the graphics generation unit 10304 so as to produce (or read out from a non-volatile memory (not shown)) a message notifying the user of the erroneous connection between output terminals, and displays the message on the display unit 10305 (step S907). The notification method is not limited to displaying a visual message, and can be any method such as outputting an audio message from a speaker unit (not shown).

In the present embodiment, no special processes are performed in the following cases:

when it is not detected in step S901 that equipment has been connected to the HDMI output terminal 1032 of the recording device 103, when a connection failure with the connected equipment is not detected in step S902, and when it is not detected in step S903 that the 5VPWR line of the HDMI output terminal has been brought to a high or intermediate voltage level.

As described thus far, according to the present embodiment, even if the recording device 103 executes, in response to the detection of equipment connected to the output terminal thereof, a predetermined operation on the connected equipment, if it is detected that the connected equipment does not perform an expected authentication operation, the recording device 103 performs an erroneous connection detection process. Specifically, the recording device 103 acts as a device that should have been connected to the connected equipment. If the connected equipment returns a proper response, the recording device 103 detects that the output terminals have been erroneously connected, and notifies the user of the erroneous connection.

In other words, the recording device 103 of the present embodiment detects the occurrence of a connection failure with connected equipment when an authentication operation that is expected to be performed on the output terminal of the recording device 103 by the connected equipment if the input terminal of the connected equipment is correctly connected to the output terminal of the recording device 103 is not performed. When a connection failure is detected, the recording device 103 executes an operation that is normally performed from the input terminal during authentication processing on the connected equipment from the output terminal as an erroneous connection detection operation. If there is a proper response from the connected equipment in response to the erroneous connection detection operation, the recording device 103 detects that the output terminals have been erroneously connected, and notifies the user of the erroneous connection.

Accordingly, the user can be made aware of the fact that output terminals have been erroneously connected, so the user can immediately take appropriate action (reconnecting the terminals).

The present embodiment was described in the context of detecting an erroneous connection of an output terminal of connected equipment to the output terminal of the recording device 103, but it is needless to say that the present embodiment is not limited to the recording device 103, and even when another device is used, the occurrence of an erroneous connection between output terminals can be detected and the user can be notified as with the present embodiment. The present embodiment is applicable to, for example, a video output device that has an HDMI output terminal, such as a digital camera or video camera, and the user can be notified of an erroneous connection between output terminals by a message being displayed on a display unit of the device.

Embodiment 4

Embodiment 4 of the present invention will be described next.

In Embodiment 1, control is performed such that the TV receiver 101, on behalf of the recording device 103, performs an authentication process with the repeater device 102, detects an erroneous connection as a result of the authentication process, and notifies the user of the erroneous connection by displaying a warning. In Embodiment 4, control is performed such that the repeater device 102 primarily performs an authentication process with the TV receiver 101 or the recording device 103, detects an erroneous connection as a result of the authentication process, and notifies the user of the erroneous connection by displaying a warning.

An AV system of the present embodiment includes, as in that of Embodiment 1 (FIG. 1), a TV receiver 101, a repeater device 102, a recording device 103 and an external operation device 104.

However, in the present embodiment, the configuration and operation of the repeater device 102 is different from that of other embodiments, and thus, the repeater device 102 will be described below.

Figure 11:
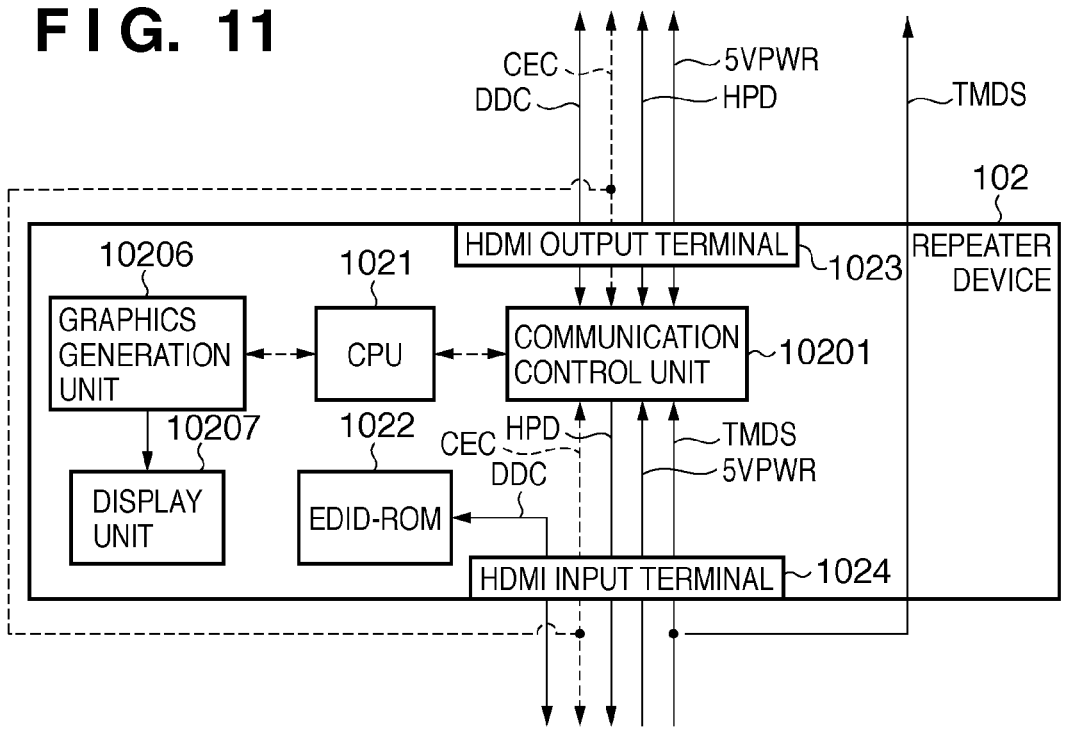
FIG. 11 is a block diagram showing an example of a configuration of a repeater device according to Embodiment 4 of the present invention.

FIG. 11 is a block diagram showing an example of a configuration of the repeater device 102 of the present embodiment. The repeater device 102 includes a communication control unit 10201, an EDID-ROM 1022, an HDMI output terminal 1023, an HDMI input terminal 1024, a CPU 1021, a graphics generation unit 10206 and a display unit 10207.

The communication control unit 10201 includes, as in the communication control unit 10301 of Embodiment 3 shown in FIG. 10, an equipment connection detection unit 1001, a connection failure detection unit 1002, a terminal control unit 1003 and an erroneous connection detection unit 1004.

FIG. 12 is a flowchart illustrating a process for detecting an erroneous connection between output terminals performed by the communication control unit 10201 of the present embodiment.

A process for detecting an erroneous connection between output terminals performed by the repeater device of the present embodiment will be described with reference to the block diagrams of FIGS. 10 and 11 and the flowchart of FIG. 12.

The equipment connection detection unit 1001 detects the insertion and removal of an HDMI cable connector into and out of the HDMI output terminal 1023 with, for example, a mechanical contact (not shown) so as to detect whether or not equipment has been connected to the HDMI output terminal 1023 of the repeater device 102 (step S1201).

If the equipment connection detection unit 1001 detects that equipment has been connected to the HDMI output terminal 1023 of the repeater device 102, the connection failure detection unit 1002 controls the terminal control unit 1003 so as to bring the 5VPWR line of the HDMI output terminal 1023 to a high voltage level (step S1202). If the connected equipment (the recording device 103) does not bring the HPD line to a high voltage level in response thereto, the connection failure detection unit 1002 detects a connection failure (step S1203).

If a connection failure is detected, the erroneous connection detection unit 1004 controls the terminal control unit 1003 capable of input and output so as to bring the 5VPWR line of the HDMI output terminal 1023 to a low voltage level (step S1204). Subsequently, the erroneous connection detection unit 1004 detects whether the 5VPWR line has been brought to a high or intermediate voltage level (step S1205).

In this case, the 5VPWR line of the HDMI output terminal 1023 of the repeater device 102 of FIG. 1 is brought to a high or intermediate voltage level. This is because it can be deemed that the recording device 103 has brought the 5VPWR line to a high voltage level as a request to start DDC communication with the EDID-ROM 1022 to the HDMI input terminal 1024 of the repeater device 102 connected to the HDMI output terminal 1032. Accordingly, the erroneous connection detection unit 1004 can detect an erroneous connection between output terminals (step S1206). The reason why the 5VPWR line becomes an intermediate voltage level is that the 5VPWR line of the HDMI output terminal 1023 of the repeater device 102 is held at a low voltage level, and the 5VPWR line of the HDMI output terminal 1032 of the recording device 103 is held at a high voltage level.

If an erroneous connection between output terminals is detected as described above, the CPU 1021 is notified of the erroneous connection between output terminals detected by the erroneous connection detection unit 1004. Then, the CPU 1021 controls, for example, the graphics generation unit 10304 so as to produce (or read out from a non-volatile memory (not shown)) a message notifying the user of the erroneous connection between output terminals, and displays the message on the display unit 10305 (step S1207). The notification method is not limited to displaying a visual message, and can be any method such as outputting an audio message from a speaker unit (not shown).

In the foregoing, an operation was described in which an erroneous connection between output terminals is detected by performing an authentication process with the recording device 103 from the HDMI output terminal 1023 of the repeater device 102. However, it is needless to say that an erroneous connection between input terminals can be detected by performing an authentication process with the TV receiver 101 from the HDMI input terminal 1024 of the repeater device 102. In this case, the communication control unit 10201 can be operated in the same manner as the communication control unit 10108 of the TV receiver 101 described in Embodiment 1. Specifically, if the erroneous connection detection unit 1004 detects a connection failure, the HDMI input terminal 1024 of the repeater device 102 brings the 5VPWR line to a high voltage level for the TV receiver 101. If the TV receiver 101 brings the HPD line of the HDMI input terminal 1024 to a high voltage level, the erroneous connection detection unit 1004 can detect an erroneous connection.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-265714, filed on Oct. 14, 2008, which is hereby incorporated by reference herein its entirety.

What is claimed is:

1. A method for controlling a device, wherein the device includes an input terminal, the method comprising:
    performing a process for determining whether or not a first level is higher than a predetermined value after an external device is turned on, wherein the first level is related to a HPD (Hot Plug Detect) line; and
    performing a predetermined process based on whether or not the first level is higher than the predetermined value if the external device and the input terminal are connected, wherein the predetermined process includes a process for informing an error relating to a connection between the external device and the device.

2. A method for controlling a device, wherein the device includes an output terminal, the method comprising:
    determining whether or not a predetermined level is higher than a first value if an external device and the output terminal are connected, wherein the predetermined level is related to a power line;
    performing a predetermined process based on whether or not the predetermined level is higher than the first value, wherein the predetermined process includes a process for informing an error relating to a connection between the external device and the device; and performing a process for determining whether or not the predetermined level is higher than the first value after a control process is performed, wherein the control process includes a process for changing the predetermined level to a second value, and wherein the second value is less than the first value.

3. A device comprising:
an input terminal; and
a control unit that performs a predetermined process based on whether or not a first level is higher than a predetermined value if an external device and the input terminal are connected, wherein the first level is related to a HPD (Hot Plug Detect) line, and the predetermined process includes a process for informing an error relating to a connection between the external device and the device, and
wherein, after the external device is turned on, the control unit performs a process for determining whether or not the first level is higher than the predetermined value.

4. The device according to claim 3, wherein the predetermined process is performed if the first level is higher than the predetermined value.

5. The device according to claim 3, wherein the predetermined process is not performed if the first level is not higher than the predetermined value.

6. The device according to claim 3, wherein the input terminal is used for receiving data.

7. The device according to claim 3, wherein the device includes one of a television, a repeater device, and a recording device.

8. The device according to claim 3, wherein, if the first level is not higher than the predetermined value, the control unit performs a process for turning the external device on.

9. A device comprising:
an input terminal; and
a control unit that performs a predetermined process based on whether or not a first level is higher than a predetermined value if an external device and the input terminal are connected, wherein the first level is related to a HPD (Hot Plug Detect) line, and the predetermined process includes a process for informing an error relating to a connection between the external device and the device, and
wherein, if the external device and the input terminal are connected, the control unit performs a process for determining whether or not the first level is higher than the predetermined value after a process for controlling a second level is performed, and wherein the second level is related to a power line.

10. The device according to claim 9, wherein the predetermined process is performed if the first level is higher than the predetermined value.

11. The device according to claim 9, wherein the predetermined process is not performed if the first level is not higher than the predetermined value.

12. The device according to claim 9, wherein the input terminal is used for receiving data.

13. The device according to claim 9, wherein the device includes one of a television, a repeater device, and a recording device.

14. A device comprising: an output terminal; and
a control unit that performs a predetermined process based on whether or not a predetermined level is higher than a first value if an external device and the output terminal are connected, wherein the predetermined level is related to a power line, and the predetermined process includes a process for informing an error relating to a connection between the external device and the device, and
wherein, if the external device and the output terminal are connected, the control unit performs a process for determining whether or not the predetermined level is higher than the first value after a control process is performed, wherein the control process includes a process for changing the predetermined level to a second value, and wherein the second value is less than the first value.

15. The device according to claim 14, wherein the predetermined process is performed if the predetermined level is higher than the first value.

16. The device according to claim 14, wherein the predetermined process is not performed if the predetermined level is not higher than the first value.

17. The device according to claim 14, wherein the output terminal is used for transmitting data.

18. The device according to claim 14, wherein the external device includes one of a television, a repeater device, and a recording device.

19. A method for controlling a device, wherein the device includes an input terminal, the method comprising:
determining whether or not a first level is higher than a predetermined value if an external device and the input terminal are connected, wherein the first level is related to a HPD (Hot Plug Detect) line;
performing a predetermined process based on whether or not the first level is higher than the predetermined value, wherein the predetermined process includes a process for informing an error relating to a connection between the external device and the device; and
performing a process for determining whether or not the first level is higher than the predetermined value after a process for controlling a second level is performed, wherein the second level is related to a power line.

20. A method for controlling a device, wherein the device includes an input terminal, the input terminal includes a first line and a second line, the first line is used for transmitting a first voltage from an output terminal of an external device to the input terminal, the second line is used for transmitting a second voltage from the input terminal to the output terminal, and the second line is related to a HPD (Hot Plug Detect) line, the method comprising:
performing a process for detecting the second voltage via the second line after the first voltage is outputted via the first line; and
performing a process for informing an error after the second voltage is detected via the second line while the first voltage is being outputted via the first line.

21. A device comprising
an input terminal, wherein the input terminal includes a first line and a second line, the first line is used for transmitting a first voltage from an output terminal of an external device to the input terminal, the second line is used for transmitting a second voltage from the input terminal to the output terminal, and the second line is related to a HPD (Hot Plug Detect) line; and
a control unit that performs a process for detecting the second voltage via the second line after the first voltage is outputted via the first line,
wherein the control unit performs a process for informing an error after the second voltage is detected via the second line while the first voltage is being outputted via the first line.

22. A method for controlling a device, wherein the device includes an output terminal, the output terminal includes a predetermined line, the predetermined line is used for transmitting first voltage from the output terminal to an input terminal of an external device, the method comprising:

performing a process for determining whether or not the first voltage is detected via the predetermined line after a changing process is performed, wherein the changing process includes a process for changing a voltage relating to the predetermined line to a second voltage, and the first voltage is higher than the second voltage; and performing a process for informing an error if the first voltage is detected via the predetermined line after the changing process is performed.

23. A device comprising:

an output terminal, wherein the output terminal includes a predetermined line, and the predetermined line is used for transmitting first voltage from the output terminal to an input terminal of an external device; and a control unit that performs a process for determining whether or not the first voltage is detected via the predetermined line after a changing process is performed, wherein the changing process includes a process for changing a voltage relating to the predetermined line to a second voltage, and the first voltage is higher than the second voltage; and wherein the control unit performs a process for informing an error if the first voltage is detected via the predetermined line after the changing process is performed.

* * * * *